United States Patent [19]

Dudgeon

[11] 4,272,310

[45] Jun. 9, 1981

[54] METHOD OF MAKING A BONDED STRUCTURE OF MAGNET WIRE

[75] Inventor: Charles D. Dudgeon, Clifton Park, N.Y.

[73] Assignee: General Electric Company, Schenectady, N.Y.

[21] Appl. No.: 85,306

[22] Filed: Oct. 16, 1979

[51] Int. Cl.³ .............................................. B65H 71/00
[52] U.S. Cl. ...................................... 156/172; 29/605; 156/175; 242/7.03; 427/104; 427/116; 427/178; 428/379
[58] Field of Search ....................... 156/172, 175, 330; 242/7.03; 29/605; 428/379; 427/104, 178, 116

[56] References Cited

U.S. PATENT DOCUMENTS

| | | | |
|---|---|---|---|
| 2,833,685 | 5/1958 | Lawrence | 428/13 |
| 2,997,776 | 8/1961 | Matter et al. | 29/605 |
| 3,038,831 | 6/1962 | Rosenberg | 156/175 |
| 3,504,431 | 4/1970 | Guilbault et al. | 29/605 |
| 3,775,175 | 11/1973 | Merian | 428/379 |
| 3,812,214 | 5/1974 | Markovitz | 525/481 |
| 3,979,478 | 9/1976 | Gallagher | 525/163 |
| 3,991,232 | 11/1976 | Kamiuchi et al. | 427/104 |

*Primary Examiner*—John J. Gallagher
*Attorney, Agent, or Firm*—Morgan, Finnegan, Pine, Foley & Lee

[57] ABSTRACT

In a novel method of forming a stator, armature, coil, etc., the steps of bonding a structure of magnet wire by applying a coating of reactive spooling oil to the length of magnet wire, followed by forming the magnet wire into a coil about an armature, making an open coil, or inserting the latter into a slot section of the core of a stator, and heating the magnet wire until the coating is converted to a hard adhesive thereby permanently forming the bonded structure of magnet wire.

12 Claims, No Drawings

METHOD OF MAKING A BONDED STRUCTURE OF MAGNET WIRE

This invention relates to a method of making a bonded structure of magnet wire. More particularly, it relates to the use of a reactive spooling oil on magnet wire to aid in forming the magnet wire into a structure, e.g., a coil for use in an armature or stator, and with the reactive spooling oil subsequently functioning as an adhesive for permanently bonding the magnet wire into the desired structure.

BACKGROUND OF THE INVENTION

In the manufacture of a stator, armature, coil, etc., used in electromechanical conversion devices, magnet wire is wound directly onto the armature or is wound into an open coil which is then inserted into a slot section of the core of a stator. Subsequently, the contiguous turns of the coiled structure are bonded together. There are at present two commonly used methods to form the bonded magnet wire, the first being the use of conventional varnishes wherein the wire to be bonded is wound about an armature or in a coil and inserted into a slot of a core of a stator, after which the assembly is simply dipped in the varnish, and then baked at an elevated temperature for a period of time to permanently bond contiguous turns of the coil. The second prior art method involves the use of magnet wire to which has been applied a self-bonding overcoat. The armature or stator is initially prepared with the self-bonding magnet wire, and the contiguous turns of the coil of magnet wire are bonded either by dipping the assembly in a solvent or by heating at elevated temperatures.

To facilitate winding of the magnet wire about the armature or into coil from for use in a stator, it is usual practice to use some form of spooling oil during the winding step. At a subsequent time it is necessary to wash off the spooling oil preparatory to the final bonding of the coils of magnet wire. As is readily apparent, the additional steps of applying the spooling oil onto the magnet wire during the forming operation and the subsequent washing operation adds to the cost of manufacture of a stator, armature, coil, etc. It would be an advantage to be able to reduce the number of steps in the formation of a bonded coil of magnet wire, and such an advantage is an object of the present invention.

DESCRIPTION OF THE INVENTION

According to the present invention there is provided a method of making a bonded structure of magnet wire which comprises applying a coating of reactive spooling oil to a length of magnet wire preparatory to forming the magnet wire into a coil for insertion into the slot of a core of a stator or about an armature and subsequently heating the formed coil of coated magnet wire such that the coating is converted to a hard adhesive thereby bonding together the contiguous turns of the coil. In the practice of the invention, any class of compounds known as cycloaliphatic epoxies or melamine resins may be employed as the reactive spooling oil for application to the magnet wire for the dual purpose of lubrication during the winding or forming of the magnet wire into the coil, and subsequently functioning as the adhesive for bonding together the contiguous turns of the magnet wire. the cycloaliphatic epoxies may include a number of latent catalysts such as boron trifloride complexes, boron trichloride complexes, as well as chelated metals, as described in U.S. Pat. No. 3,812,214 to Markovitz, the disclosure of which is incorporated herein by reference.

DESCRIPTION OF THE PREFERRED EMBODIMENTS

A conventional magnet wire consisting of a 0.0403" copper wire coated with 3 mils of polyesterimide wire enamel is coated with a reactive spooling oil formed from a class of compounds known as cycloaliphatic epoxies. The reactive spooling oil compound may be formed by adding together the following:

(a) Union Carbide ERL-4221 3,4-epoxycyclohexylmethyl(3,4-epoxy)cyclohexane carboxylate cycloaliphatic epoxy in the amount of 90 grams, or approximately 87% by weight of the total weight of the compound;

(b) butyrolactone in the amount of 10 grams or approximately 9% by weight of the total weight of the compound; and (c) $BF_3$ monoethyl amine in the amount of 3.5 grams or approximately 4% by weight of the total weight of the compound.

The resulting reactive spooling oil is applied to the surface of the magnet wire so as to result in a thin film of oil about the entire circumference and length of the magnet wire. The reactive spooling oil may be applied to the magnet wire by wiping, or by dipping the wire into the compound. Next, the wire is tightly wound about an armature such that the contiguous turns of the magnet wire are in abutting relationship. During the winding operation the reactive spooling oil acts as a lubricant for aiding in the winding operation. Whereas the spooling oils used in prior art techniques for forming bonded magnet wire had to be washed off, in the subject process the reactive spooling oil compound remains on the wound magnet wire, and the assembly of the armature and coil is then subjected to an elevated temperature for the rapid conversion of the cycloaliphatic epoxy compound to a hard adhesive for permanently bonding together the contiguous turns of the magnet wire. Preferably, the assembly including the coil of magnet wire is baked in an oven at a temperature of approximately 170° C. for a period of approximately two hours. In an actual test conducted it was found that the bond strength of the resulting coil at 150° C. was 4.8 pounds, with the bond strength being determined by use of an Instron universal testing machine where the load was applied to the center of the coil at a rate of 0.5 inches per minute, and the stress at the break point (in pounds) was designated as the bond strength.

Accordingly, the reactive spooling oil in the form of the cycloaliphatic epoxy compound which is applied to the magnet wire first lubricates the wire during the winding operation, and secondly, is heated for rapid conversion into a hard adhesive for permanently bonding together the contiguous turns of the magnet wire to form the coil. Thus, in the process of the subject invention, the number of steps for forming the coil is less than heretofore required, thereby resulting in a more efficient and less costly procedure for bonding the magnet wire into a coil.

In an alternate embodiment of the subject invention, the magnet wire is prepared for winding by first being coated with a reactive spooling oil made of a melamine resin compound. The latter is formed by mixing:

(a) Cymel 303 liquid hexamethoxymethyl melamine resin (American Cyanamid Co.) in the amount of approximately 45 grams, corresponding to approximately 89.5% by weight of the total weight of the compound;

(b) water in the amount of approximately 5 grams, corresponding to approximately 10% by weight of the total weight of the compound; and (c) p-toluene sulfonic acid in the amount of 0.25 grams, corresponding to approximately 0.5% by weight of the total weight of the compound.

The melamine resin compound is applied to the length and circumference of the magnet wire, as for example by wiping or dipping, after which the magnet wire is tightly wound around a rod in a helical fashion such that the contiguous turns of the magnet wire are in abutting relationship. The coil of magnet wire is then heated by resistance heating at an elevated temperature of approximately 220° C.–230° C. for a period of approximately 10 to 15 seconds, after which the coil is removed and allowed to cool to room temperature. During the winding operation, the melamine resin compound functions as a lubricant to aid in the winding step, and during exposure to the elevated temperature, the compound is rapidly converted to a hard adhesive for bonding the magnet wire coil. Bond strength of the resulting coil, as determined in an Instron universal testing machine, for various temperatures was determined as follows:

| Temperature, Degrees C. | Bond Strength (Pounds) |
|---|---|
| 20 | 26.0 |
| 150 | 4.3 |
| 200 | 1.2 |
| 250 | 0.8 |

Accordingly, there is provided a new and improved method for forming a stator, armature, or coil by bonding of the contiguous turns of a wound magnet wire by first preparing the magnet wire by applying a coating of reactive spooling oil thereto, and then winding the magnet wire about an armature or into a coil for insertion into a slot in the core of a stator. Next, without removing the reactive spooling oil from the magnet wire, the coil is subjected to an elevated temperature to rapidly convert the reactive spooling oil to a hard adhesive, thereby permanently bonding the contiguous turns of the magnet wire.

Many variations of the present invention will become apparent to those skilled in this art in light of the above, detailed description. All such obvious variations are within the full intended scope of the appended claims.

I claim:

1. In a method of making a bonded structure of magnet wire, the steps comprising:

applying a dual-purpose coating of reactive and lubricating spooling oil mixture to a length of unlubricated magnet wire;

forming the magnet wire into a coil, with the continguous turns of the magnet wire being in abutting relationship; and heating said coil of magnet wire whereby said coating is converted to a hard adhesive for bonding together the contiguous turns of said coil.

2. A method of making a bonded structure of magnet wire as in claim 1 wherein said reactive spooling oil is wiped onto the length of magnet wire to apply a thin film of oil on said wire.

3. A method of making a bonded structure of magnet wire as in claim 1 wherein said magnet wire is heated by a resistance heating process.

4. A method of making a bonded structure of magnet wire as in claim 1 wherein said reactive spooling oil is a mixture including cycloaliphatic epoxy.

5. A method of making a bonded structure of magnet wire as in claim 1 wherein said reactive spooling oil is a mixture including melamine resin.

6. A method of making a bonded structure of magnet wire as in claim 4 wherein said reactive spooling oil is a mixture having, in proportion, by weight, approximately 87% cycloaliphatic epoxy, approximately 9% butyrolactone, and approximately 4% BF$_3$ monoethyl amine.

7. A method of making a bonded structure of magnet wire as in claim 6 wherein said coated magnet wire is baked in an oven at a temperature of approximately 170° C. for a period of approximately two hours for forming said bonded structure of magnet wire.

8. A method of making a bonded structure of magnet wire as in claim 5, wherein said reactive spooling oil mixture has in proportion by weight approximately 89.5% melamine resin, approximately 10% water, and approximately 0.5% p-toluene sulfonic acid.

9. A method of making a bonded structure of magnet wire as in claim 8 wherein said coated magnet wire is resistance heated at a temperature of approximately 220° C.–230° C. for a period of approximately 10–15 seconds to form the bonded structure of magnet wire.

10. In a method of making a bonded structure of magnet wire, the steps comprising:

applying a dual-purpose coating of reactive and lubricating spooling oil mixture onto a length of unlubricated magnet wire;

forming the magnet wire into a coil, with the contiguous turns of the magnet wire being in abutting relationship; and heating said coil of magnet wire whereby said coating is converted to a hard adhesive for bonding together the contiguous turns of said coil, said reactive spooling oil mixture including the epoxy resin compound 3,4-epoxycyclohexylmethyl(3,4-epoxy)cyclohexane carboxylate, or the melamine resin compound hexamethoxymethylmelamine.

11. A method of making a bonded structure of magnet wire as in claim 10 wherein said reactive spooling oil mixture includes 3,4-epoxycyclohexylmethyl(3,4-epoxy)cyclohexane carboxylate.

12. A method of making a bonded structure of magnet wire as in claim 10 wherein said reactive spooling oil mixture includes hexamethoxymethylmelamine.

* * * * *